(12) United States Patent
Herrmann

(10) Patent No.: US 8,802,224 B2
(45) Date of Patent: Aug. 12, 2014

(54) REINFORCING MATERIAL FOR THE LOCAL REINFORCEMENT OF A COMPONENT FORMED WITH A COMPOSITE MATERIAL, AND METHOD

(75) Inventor: Axel Herrmann, Stade (DE)

(73) Assignee: Airbus Operations GmbH, Hamburg (DE)

( * ) Notice: Subject to any disclaimer, the term of this patent is extended or adjusted under 35 U.S.C. 154(b) by 539 days.

(21) Appl. No.: 12/223,936

(22) PCT Filed: Feb. 1, 2007

(86) PCT No.: PCT/EP2007/050960
§ 371 (c)(1),
(2), (4) Date: Oct. 10, 2008

(87) PCT Pub. No.: WO2007/093503
PCT Pub. Date: Aug. 23, 2007

(65) Prior Publication Data
US 2010/0316857 A1     Dec. 16, 2010

(30) Foreign Application Priority Data
Feb. 17, 2006 (DE) .......................... 10 2006 007 428

(51) Int. Cl.
| | | |
|---|---|---|
| *B32B 15/08* | (2006.01) | |
| *B32B 7/02* | (2006.01) | |
| *B05D 5/10* | (2006.01) | |
| *B32B 27/00* | (2006.01) | |
| *B32B 27/08* | (2006.01) | |
| *B32B 27/32* | (2006.01) | |
| *B32B 17/10* | (2006.01) | |
| *C09J 7/02* | (2006.01) | |

(52) U.S. Cl.
CPC ................. *B32B 27/00* (2013.01); *B32B 27/08* (2013.01); *B32B 15/08* (2013.01); *B32B 27/32* (2013.01); *B32B 17/10761* (2013.01); *C09J 7/0246* (2013.01)
USPC ......... 428/215; 428/343; 427/207.1; 427/534

(58) Field of Classification Search
CPC ........ B32B 27/00; B32B 27/08; B32B 15/08; B32B 27/32; B32B 17/10761; B32B 7/12; C09J 7/0246; C09J 7/0296; C09J 2433/00
USPC ................ 428/215, 343, 355; 427/207.1, 534
See application file for complete search history.

(56) References Cited

U.S. PATENT DOCUMENTS

| | | |
|---|---|---|
| 2,852,421 A | 9/1958 | Bergstedt |
| 4,217,157 A | 8/1980 | Stoltze et al. |
| 4,764,409 A | 8/1988 | Freeman |
| 5,141,400 A | 8/1992 | Murphy et al. |
| 5,780,157 A * | 7/1998 | Tuffias et al. .................. 428/408 |
| 5,958,578 A | 9/1999 | Blohowiak et al. |
| 2006/0153669 A1* | 7/2006 | Miller et al. .................. 414/800 |
| 2007/0202255 A1* | 8/2007 | Shinoda et al. ............. 427/255.6 |

FOREIGN PATENT DOCUMENTS

| | | |
|---|---|---|
| DE | 970339 | 9/1958 |
| DE | 3727462 | 3/1989 |
| DE | 694 32 981 | 4/2004 |
| EP | 0783960 | 1/1997 |
| EP | 0 938 969 | 9/1999 |
| EP | 1082217 B1 * | 6/2002 |
| EP | 1422048 A2 | 5/2004 |
| EP | 1495859 | 6/2004 |
| EP | 1495858 | 1/2005 |
| GB | 2421926 | 7/2006 |
| JP | 52-015586 | 2/1977 |
| JP | 02-039930 | 7/1988 |
| JP | 01-163059 | 6/1989 |
| JP | 02060742 | 3/1990 |
| JP | 03-092346 | 4/1991 |
| JP | 2005-271349 | 10/2005 |
| WO | WO 95/20479 | 8/1995 |
| WO | 0120056 | 3/2001 |
| WO | WO 2005031037 A1 * | 4/2005 |

OTHER PUBLICATIONS

Machine_English_Translation_EP_1082217_B1, Herrmann Axel, Composite Material with a Reinforced Connecting Area, Mar. 14, 2001, Espacenet, whole document.*

Daniel Gay, "Matériaux composites" Mar. 1997, p. 166, Hermes, Paris. XP002433190.
Partial translation of citations in corresponding Japanese application Office action.
"Eigenschaften und Einsatz von Kunststoffen in der Beschichtung" Sep. 1968, S. 962.
German Office Action, Feb. 17, 2006.
Chinese Office Action, May 27, 2010.
Chinese Office Action, Dec. 9, 2011.

\* cited by examiner

*Primary Examiner* — Aaron Austin
*Assistant Examiner* — Tahseen N Khan
(74) *Attorney, Agent, or Firm* — Greer, Burns & Crain Ltd.

(57) ABSTRACT

Disclosed is a reinforcing material for the local reinforcement of a component formed with a composite material, in particular in areas of force introduction and/or connecting areas. The reinforcing material is formed by a metallic sheet-like formation, the metallic sheet-like formation having a surface with increased roughness to improve adhesion and a coating applied to the surface to provide a seal and improve the bond with the composite material. As a result of the presence of a coating on the metallic sheet-like formation, once it has been rolled up on supply rolls, said sheet-like formation can be drawn off from the supply rolls and at the same time processed in an automated manner by means of known computer-controlled laying devices with CRP prepreg materials in web form by laying layer by layer to produce components, in particular of large format, for aircraft. The reinforcing material thereby ensures a high embedding strength in the case of introduced boreholes or the like, in particular in areas of force introduction and/or connecting areas. Also disclosed is a method for producing a reinforcing material. In addition, the invention relates to a method for producing components, in particular components of large format for aircraft, with the composite material and with the reinforcing material.

13 Claims, 2 Drawing Sheets

REINFORCING MATERIAL FOR THE LOCAL REINFORCEMENT OF A COMPONENT FORMED WITH A COMPOSITE MATERIAL, AND METHOD

FIELD OF THE INVENTION

The invention relates to a reinforcing material for the local reinforcement of a component formed with a composite material, in particular in areas of force introduction and/or connecting areas.

Furthermore, the invention relates to a method for producing the reinforcing material. In addition, the invention relates to a method for producing components, in particular components of large format for aircraft, with the composite material and with the reinforcing material.

BACKGROUND OF THE INVENTION

In lightweight construction, in particular in aircraft construction and in aerospace, fibre reinforced composite components, which have a high weight saving potential on account of their extremely high strength with at the same time low mass, are increasingly being used for load-bearing structural components. With high requirements expected of the mechanical properties, the composite components are formed with carbon-fibre reinforced epoxy resins. This involves arranging one on top of the other, or stacking, a multiplicity of layers with carbon fibres that are impregnated with epoxy resin. Here, the layers each have different fibre orientations, in order to optimize the finished composite component for specific directions of loading. The fibre orientations in the respective layers may be, for example, 0° and ±45°. For producing such composite components, it is particularly preferred to use a so-called CRP prepreg material, which is formed with carbon fibres already preimpregnated (saturated) with a suitable epoxy resin to form a resin matrix. Here, the carbon fibres may be arranged in the form of a woven fabric, a scrim or rovings, that is to say in the form of oriented fibre strands. The curing of the CRP prepreg material takes place in a known way, for example in vacuum bags in autoclaves or the like.

To allow the composite components to be connected to other structural components, boreholes must be introduced into the composite components, so that for example bolts can be introduced for connection to further components. However, the embedding strength of composite components is not very high in comparison with the tensile or compressive strength on account of the carbon fibres generally running parallel to the surfaces of the component. It is therefore necessary to provide additional mechanical reinforcements in areas of force introduction and/or connecting areas, for example in the form of boreholes to produce a bolted or riveted connection.

These mechanical reinforcements may be formed for example as so-called doublers. Doublers comprise additional layers of the composite material applied to the actual composite component in areas of force introduction and/or connecting areas. However, the doublers have the disadvantage that they allow thickenings to be created in the areas of force introduction or connecting areas, often leading to restrictions in the structural design.

Furthermore, it is known to integrate planar metallic sheet-like formations in the layer structure, in particular in areas of force introduction or connecting areas, of a composite component. This involves alternately stacking layers of the metallic sheet-like formations and the CRP prepreg material one on top of the other. The combination of the high embedding strength of the metallic sheet-like formations together with the high tensile or compressive strength of the composite material conjointly produce advantageous mechanical properties even in areas of force introduction or connecting areas.

However, the integration of layers of a sheet-like formation in the layer structure of the CRP composite component to improve the mechanical properties in areas of force introduction or connecting areas, for example in the form of boreholes to produce bolted or riveted connections between composite components or the like, has previously been too complex in production engineering terms and, if carried out at all, has so far only been partly automated.

SUMMARY OF THE INVENTION

It is therefore an object of the invention to provide a suitable reinforcing material, in particular for epoxy resin-based CRP composite components, that allows easy and, in particular automatic, processability, to allow such reinforcing zones to be produced in components, in particular of large format, with composite materials.

This object is achieved by a reinforcing material for the local reinforcement of a component formed with a CRP prepreg material in web form laid layer by layer, in particular in areas of force introduction and/or connecting areas, wherein the reinforcing material is formed by a metal foil in web form, the metal foil having a surface with increased roughness to improve adhesion and an adhesive coating of a curable synthetic resin applied to the surface to provide a seal and improve the bond with the composite material and also for tacking on the component during the laying process.

The fact that the reinforcing material is formed by a metallic sheet-like formation, the metallic sheet-like formation having a surface with increased roughness to improve adhesion and a coating applied to the surface to provide a seal and improve the bond with the composite material, means that there is good adhesion between the reinforcing material and the adjoining layers of the composite material, so that a high embedding strength with at the same time optimal tensile, compressive and shear strength of a composite component, in particular of large format, formed with the reinforcing material and the composite material is achieved.

In addition, the coating seals the surface of the metallic sheet-like formation after a surface treatment carried out in advance to increase the surface roughness, so that for example the depositing of contaminants on the metallic sheet-like formation, which could impair the connection or adhesion to the layers of the composite material, is avoided to the greatest extent.

In addition, the coating ensures an initial tacking of the metallic sheet-like formation on a layer of CRP prepreg material lying thereunder, if the metallic sheet-like formation, preferably in web form, is drawn off from a supply roll and laid layer by layer by means of automated laying devices ("tape layers") to form composite components, in particular of large format, with local reinforcing zones. Here it is assumed that the CRP prepreg material is also in web form and—just like the metallic sheet-formation as the reinforcing material—is drawn off from a supply roll and laid in layers by means of automated laying devices. Uncontrolled positional changes or slipping of the reinforcing material, and consequently of the entire layer structure, are largely avoided.

One particular embodiment provides that the composite material is formed by a multiplicity of carbon fibres which are impregnated with a curable synthetic resin.

As a result, high mechanical strengths can be achieved together with low weight.

According to a further embodiment, the coating of the metallic sheet-like formation is formed by a curable polymer material, in particular by the curable synthetic resin.

The fact that the coating of the metallic sheet-like formation used for the local reinforcement of the composite material is formed by the same curable synthetic resin that corresponds substantially to the synthetic resin used to form the resin matrix in the CRP prepreg material that is used means that an optimum adhesive bond is obtained between the metallic sheet-like formation and the composite material or the resin matrix surrounding the carbon fibres.

In accordance with a further embodiment of the invention, the curable synthetic resin is an epoxy resin, a polyester resin, a BMI resin or the like.

The use of epoxy resin makes a connection that is mechanically very solid possible between the metallic sheet-like formation and the composite material.

A further embodiment provides that the composite material is a CRP prepreg material.

The CRP prepreg material, which comprises carbon fibres already preimpregnated with an epoxy resin, allows simple further processing by machine, since impregnation with a resin system to form the resin matrix after laying the carbon fibres is no longer required. The curing of the laid layers of the CRP prepreg material in web form and the possibly interposed layers of titanium foil to form finished composite components is performed in a conventional way, for example in a vacuum bag, in an autoclave or the like.

In accordance with a further embodiment, it is provided that the metallic sheet-like formation and the composite material respectively have a substantially web-like form and in the rolled-up state can be drawn off from a supply roll and can be laid in layers to form components, in particular of large format, of the composite material and the reinforcing material.

The web-like form of the reinforcing material and the composite material allows fabrication of components of large format by means of at least partly automatically operating, for example computer-controlled, laying devices. For this purpose, the composite material and possibly the reinforcing material, for example if areas of force introduction or connecting areas are to be created, are drawn off from supply rolls and laid layer by layer by means of automatic laying devices to form the finished component.

One particular embodiment of the reinforcing material according to the invention provides that the metallic sheet-like formation is formed by an at least titanium-containing alloy.

As a result, very high embedding strengths can be achieved in the areas of force introduction or connecting areas of the components formed by the reinforcing material and the composite material. At the same time, such components have very good mechanical tensile, compressive and shear strengths.

In accordance with a further embodiment, it is provided that the metallic sheet-like formation is a titanium foil, a high-grade steel foil or the like.

The titanium foil as a reinforcing material produces extremely high embedding strength with at the same time low weight of the composite material locally reinforced with it. The use of a high-grade steel foil produces a comparable embedding strength with increased weight. Alternatively, the use of a titanium grid and/or titanium fabric or a perforated titanium foil is also possible, to improve the adhesive bond between the individual layers of the CRP prepreg material and the layers of the titanium foil. The forming of the metallic sheet-like formation as a foil also allows it to be brought into the form of a roll and thus drawn off from a supply roll and laid, together with the CRP prepreg materials, preferably likewise in roll form, to form composite components, in particular of large format, at least partly automatically by means of automated laying devices.

Furthermore, according to an inventive method for producing the reinforcing material, the metal foil is first subjected to a surface treatment to increase the roughness of the surface to improve adhesion and subsequently the adhesive coating of the curable synthetic resin is applied to seal the surface and to improve the bond with the CRP prepreg material in web form.

The fact that the metallic sheet-like formation is first subjected to a surface treatment to increase the roughness of the surface to improve adhesion and subsequently the coating with the curable synthetic resin is applied to seal the surface and to improve the bond with the composite material means that an optimum mechanical bond is obtained between the reinforcing material, introduced at least layer by layer or portion by portion to improve the embedding strength in areas of force introduction and/or connecting areas, and the composite material.

If the component is formed by laying the composite material, in particular the CRP prepreg material, layer by layer, the reinforcing material being laid in particular in areas of force introduction and/or connecting areas at least portion by portion, then areas with a high embedding strength can be created within the composite material. To produce finished components, in particular of large format, the reinforcing material in roll form and/or the composite material, likewise preferably in roll form, are drawn off and laid by means of at least partly automatic laying devices, so that such composite components can be produced with a relatively low fabricating effort quickly and inexpensively.

BRIEF DESCRIPTION OF THE DRAWINGS

The present invention is explained in more detail below using preferred exemplary embodiments and with reference to the attached figures of the drawings, in which.

In the figures, the same reference numbers refer to identical or functionally identical components unless otherwise stated.

DETAILED DESCRIPTION OF THE INVENTION

Figure 1:
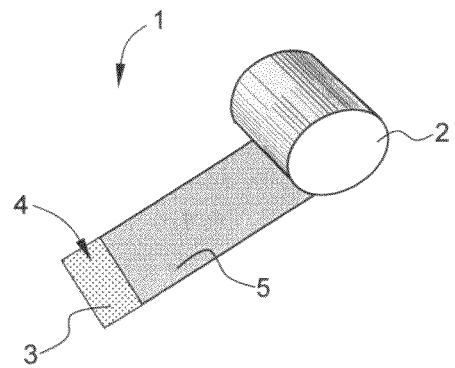
FIG. 1 shows a perspective representation of the reinforcing material rolled up for processing.

FIG. 1 shows a perspective view of the reinforcing material according to the invention.

The reinforcing material 1 in web form is rolled up to form a supply roll 2. The supply roll 2 may be processed in already known automatic, computer-controlled laying devices for CRP prepreg materials in web form to produce composite components, in particular of large format, that is to say drawn off and laid layer by layer. It is therefore possible to process the reinforcing material 1 in web form together with the CRP prepreg material on the same device to create components, in particular of large format, from the composite material.

The reinforcing material 1 according to the invention is formed by a metallic sheet-like formation in the form of a web-like titanium foil 3. As an alternative to this, a foil which is formed by a titanium-containing alloy may also be used. Alternatively, it is possible to form the metallic sheet-like formation by a woven fabric and/or a scrim of titanium wires or a titanium foil perforated by means of laser drilling or provided with clearances. Furthermore, it is possible, in particular when there are low weight requirements, to use for example foils of other metals, for example a high-grade steel foil. The same correspondingly applies to the use of woven fabrics and/or scrims of metallic wires. The titanium foil 3 in the exemplary embodiment shown has a material thickness of between 0.2 mm and 1 mm. The width of the titanium foil 3 may be between 0.5 m and 5 m, depending on the geometrical dimensions of the component to be fabricated.

The titanium foil 3 has a surface 4 with increased roughness. The surface 4 with increased roughness may be created by a previously known method. For example, the surface of the titanium foil 3 may be roughened by chemical and/or physical methods, such as for example etching or grinding, to improve adhesion. With particular preference, the surface treatment of the titanium foil 3 is performed by the so-called plasma method. The term increased roughness means here a roughness on the microscopic scale, that is to say only minor roughenings.

According to the invention, a coating 5 of a curable epoxy resin is subsequently applied to the titanium foil 3. The coating 5 is preferably formed here by substantially the same resin system that is also used for the resin system in the CRP prepreg material in web form or in the composite material that is used. In principle, other polymer materials may be used to produce the coating 5, as long as an adequate adhesive bond with the CRP prepreg material can be achieved. The coating has a thickness of less than 1 mm, preferably a material thickness of 0.1 mm. The material thickness of the titanium foil 3 including the coating is preferably chosen such that it corresponds approximately to the material thickness of a layer of the CRP prepreg material, in order to avoid undesired thickenings in the region of the local reinforcing zone to be created.

The surface 4 with the increased roughness improves in particular the adhesion of the coating 5, and consequently the adhesive bond between the reinforcing material 1 and the adjacent layers of the CRP prepreg material. At the same time, the coating 5 prevents contamination of the surface 4 of the titanium foil 3 with foreign bodies and/or liquids, which generally adversely influence the adhesion. In addition, when laying is performed by means of the laying device, the reinforcing material 1 is adhesively "tacked" on the underlying surface, that is to say in particular on the layers with CRP prepreg material lying thereunder. This brings about temporary positional fixing in the laminate structure, thereby preventing in particular positional changes, which may lead to undefined changes of the mechanical properties. Unwanted lifting-off again and/or uncontrolled positional changing of the already laid reinforcing materials 1 and/or webs of the CRP prepreg material during the laying process when creating the composite components, in particular of large format, with the local reinforcing zones of increased embedding strength are consequently largely avoided.

Figure 2:
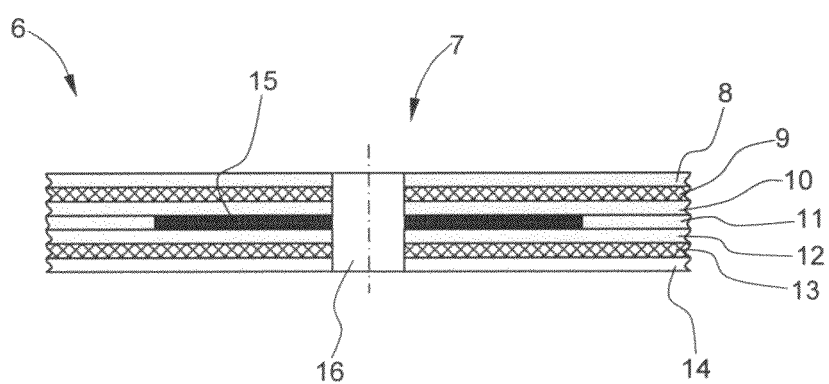
FIG. 2 shows a schematic cross-sectional representation through the component formed with the composite material and the reinforcing material, with an area of force introduction or connecting area.

FIG. 2 shows a greatly schematized cross-sectional representation through a portion of a component formed with the reinforcing material according to the invention and a composite material in an area of force introduction or connecting area.

A component 6 has an area of force introduction and/or connecting area 7, which is formed by way of example by stacking layers 8 to 14 of the CRP prepreg material and a layer 15 with the reinforcing material 1 one on top of the other. The reinforcing material 1 is preferably formed as a titanium foil 3 coated with epoxy resin (cf. FIG. 1), the resin system used for the coating preferably also corresponding to the resin system that is used in the CRP prepreg material. If the preconditions for adhesion are satisfied, the coating 5 may also be formed by some other resin system. The layers 8, 10, 11, 12 and 14 have in the exemplary embodiment a fibre orientation of 0°, while the layers 9 and 13 have a fibre orientation of ±45°. The area of force introduction and/or connecting area 7 serves in the exemplary embodiment shown for the introduction of a borehole 16 into the component 6. By means of the borehole 16 and a connecting element (not represented), for example a bolt or a rivet, a connection with a further component can be established or a force can be introduced into the component 6. In this context, the area of force introduction and/or connecting area 7 represents a local reinforcing zone.

The layer 15 formed with the reinforcing material 1 ensures here the desired high embedding strength of the borehole 16, while the further layers 8 to 14 of the CRP prepreg material ensure a high tensile, compressive or shear strength of the component 6 even in the local reinforcing zone. The composite of the layers 8 to 14 of the CRP prepreg material and the layer 15 of the reinforcing material 1 (titanium foil 3 with the coating 5) produce virtually optimum mechanical material properties.

The material thickness of a layer 15 of the reinforcing material 1 is preferably chosen such that it corresponds approximately to the material thickness of the adjoining layer 11 of the CRP prepreg material.

As a departure from the greatly schematized representation of FIG. 2, a different layer structure, with possibly likewise different fibre orientations within the CRP prepreg material, may be provided. In particular, it may be necessary to provide a considerably greater number of layers 15 of the reinforcing material 1 to increase the embedding strength of the borehole 16. In addition, it is possible not only to provide the reinforcing material 1 in the area of force introduction and/or connecting area 7 but to introduce the reinforcing material 1 over the entire extent of the surface area of the component 6.

Figure 3:
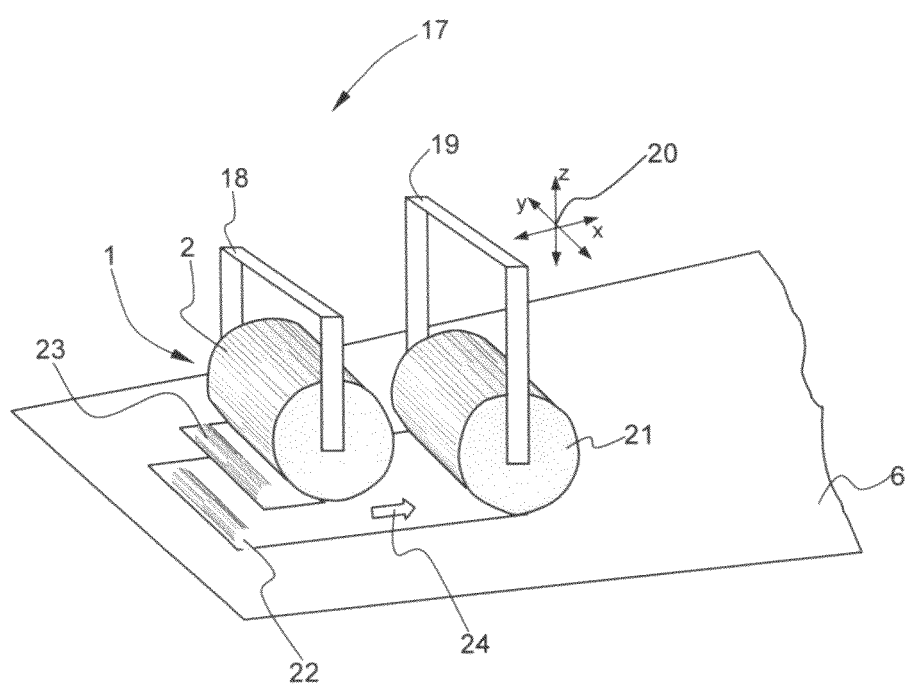
FIG. 3 shows a device for producing components, in particular of large format, from the composite material and the reinforcing material.

FIG. 3 illustrates the sequence of the method according to the invention for producing components, in particular of large format, with the composite material and the reinforcing material by using a laying device 17. The automatic laying device 17 comprises, inter alia, two holding frames 18, 19, which can be freely positioned in all spatial directions, as represented by the system of coordinates 20, by means of actuating drives (not represented any more specifically) and a correspondingly formed control system. Underneath the laying device 17 is the component 6 to be fabricated. The holding frame 18 serves for receiving the supply roll 2 with the reinforcing material 1 in web form, in the form of the titanium foil 3 having the coating 5. The holding frame 19 serves for receiving a supply roll 21 with the CRP prepreg material. Also provided are two additional pressure rolls 22, 23, by means of which the CRP prepreg material in web form or the reinforcing material 1, likewise in web form, can be pressed onto already laid layers. In addition, it is possible to provide the pressure rolls 22, 23 with a cutting function, in order that the reinforcing material 1 can be cut off in an automated manner, for example over regions in which no areas of force introduction and/or connecting areas are to be created, so that in these regions only the CRP prepreg material is laid. Alternatively, it is possible for the laying device 17 to have separate cutting devices in addition to the pressure rolls 22, 23 for cutting off the reinforcing material 1 or the CRP prepreg material. Not only the supply rolls 2, 21 but also the pressure rolls 22, 23 and the cutting devices (not represented any more specifically) are controlled and monitored by the control system. In the representation of FIG. 3, the laying device moves in the direction of the arrow 24.

The web-like form of the reinforcing material 1 according to the invention and of the CRP prepreg material together with the laying device 17 controlled by the control system allow virtually fully automated production of components. This involves drawing off the reinforcing material 1 and the CRP prepreg material from the supply rolls 2, 21 and laying them layer by layer, stacked one on top of the other, until the desired material thickness of the component 6 to be produced, in particular of large format, is achieved. The component 6 may be, for example, a shell of a wing or of a horizontal or vertical tail assembly. The depositing of the reinforcing material 1 is preferably performed here in areas of force introduction and/or connecting areas, that is to say local reinforcing zones of the component 6 to be produced, to ensure adequate embedding strength without requiring multiple thickening of the material to be provided in the form of CRP doublers. Therefore, the components fabricated by the method according to the invention or by using the reinforcing material (titanium foil) according to the invention by means of the automated laying method always have approximately the same material thickness even in areas of increased embedding strength.

The processing of the reinforcing material 1 and the CRP prepreg material together on the automated laying device 17 in accordance with the method as provided by the invention therefore allows cost-effective production of such components.

What is claimed is:

1. A reinforcing material for the local reinforcement of a layered component formed with
    a carbon fiber reinforced plastic (CRP) prepreg material and
    a curable synthetic resin as a resin matrix, the reinforcing material further comprising:
    a surface roughened metallic sheet-like form, and
    an adhesive coating of a curable synthetic resin capable of sealing the roughened surface of the metal foil,
    wherein the metal foil surface comprises roughness on the microscopic scale, formed by at least one of a grinding, etching, coating, and plasma treatment,
    wherein said adhesive coating comprises the same curable synthetic resin used to form a resin matrix in the CRP prepreg material,
    wherein said adhesive coating provides tacking of the reinforcing material to the layered component, and
    wherein the metallic sheet-like form has a substantially web-like form.

2. The reinforcing material according to claim 1, wherein the curable synthetic resin is at least one of an epoxy resin, a polyester resin and a BMI resin.

3. The reinforcing material according to claim 1, wherein the CRP prepreg material is formed by a carbon-fibre reinforced epoxy resin.

4. The reinforcing material according to claim 1, wherein the metallic sheet-like form and the CRP prepreg material in the rolled-up state can be drawn off from a supply roll and can be laid in layers to form components of the CRP prepreg material and the metallic sheet-like form.

5. The reinforcing material according to claim 1, wherein the metallic sheet-like form has a material thickness of between 0.1 mm and 1 mm and the coating has a material thickness of less than 0.5 mm.

6. The reinforcing material according to claim 1, wherein the metallic sheet-like form has a width of between 0.5 m and 5 m.

7. The reinforcing material according to claim 1, wherein the metallic sheet-like form comprises a titanium-containing alloy.

8. The reinforcing material according to claim 1, wherein the metallic sheet-like form is a high-grade steel foil.

9. The reinforcing material according to claim 1, wherein the reinforcing material is for the local reinforcement of a component formed with a CRP prepreg material in web form laid layer by layer in at least one of an area of force introduction and a connecting area.

10. A method for producing the reinforcing material according to claim 1, wherein the metal foil is first subjected to a surface treatment to increase the roughness of the surface to improve adhesion and subsequently the adhesive coating of the curable synthetic resin is applied to seal the surface and to improve the bond with the CRP prepreg material in web form.

11. The method according to claim 10, wherein the surface treatment to increase the roughness of the surface of the metal foil is performed by at least one of mechanical methods and chemical methods.

12. The method according to claim 10, wherein the surface treatment to increase the roughness of the surface of the metal foil is performed by at least one of grinding, etching and coating.

13. The method according to claim 10, wherein the surface treatment to increase the roughness of the surface of the metal foil is performed by a plasma treatment.

* * * * *